(No Model.)
W. T. YANDOW.
METHOD OF DESTROYING INSECTS.
No. 497,937. Patented May 23, 1893.
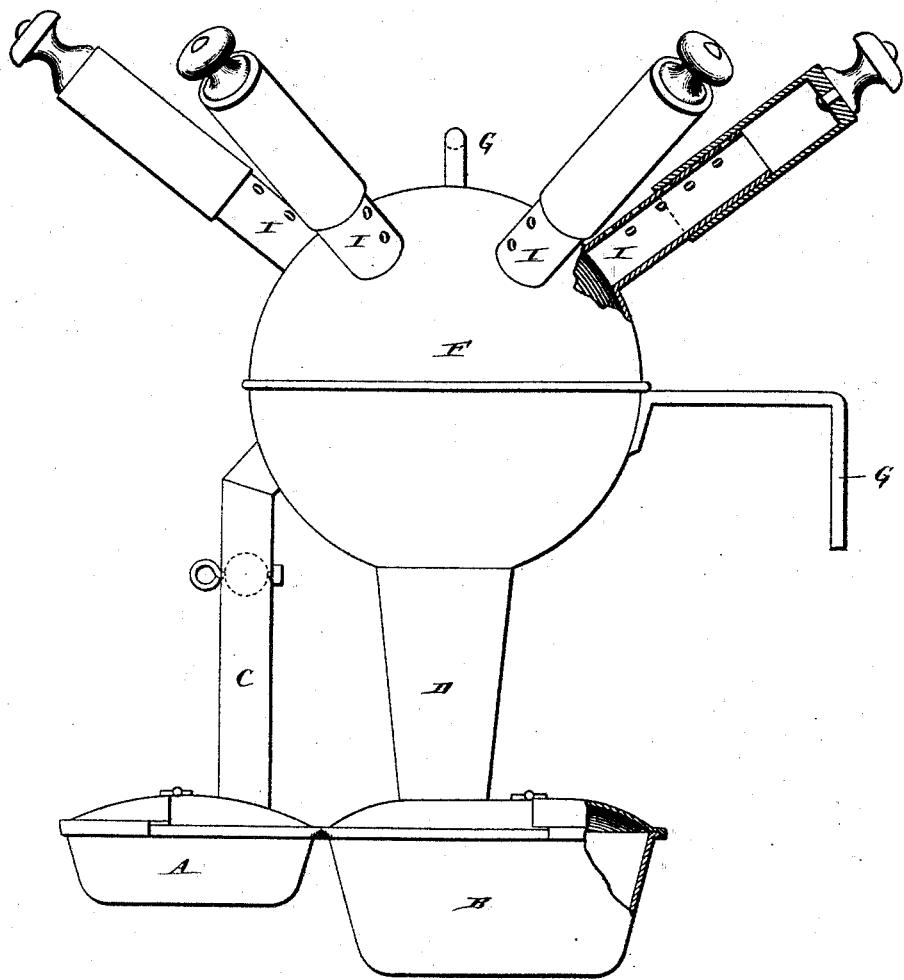

UNITED STATES PATENT OFFICE.

WILLIAM T. YANDOW, OF WINOOSKI, VERMONT.

METHOD OF DESTROYING INSECTS.

SPECIFICATION forming part of Letters Patent No. 497,937, dated May 23, 1893.

Application filed March 14, 1892. Serial No. 424,928. (No specimens.)

*To all whom it may concern:*

Be it known that I, WILLIAM T. YANDOW, a citizen of the United States, residing at Winooski, in the county of Chittenden and State of Vermont, have invented certain new and useful Improvements in Methods of Destroying Insects about Trees; and I do hereby declare the following to be a full, clear, and exact description of the invention, such as will enable others skilled in the art to which it appertains to make and use the same.

My invention relates to a novel method of destroying insects about fruit and other trees, and it consists in mixing unslaked lime, carbonate of ammonia and corrosive sublimate in proper proportions in a suitable receptacle and vaporizing the same to produce an offensive odor by adding ammonia water; burning a suitable quantity of quassia wood, tobacco, resin and sulphur to produce a dense smoke; commingling the gases or vapors from the two mixtures in a separate receptacle, and allowing the thus mixed gases to pass into the atmosphere at points adjacent to the insects to be destroyed or driven away as will be hereinafter described and claimed.

The accompanying drawing represents a side elevation, partly in section, of an apparatus adapted for carrying out my invention, for which apparatus Letters Patent of the United States were granted me on the 24th day of March, 1891, No. 448,738.

In this drawing A B represent two reservoirs or chambers of different sizes. In the reservoir A is placed the composition for creating an offensive odor and in the reservoir B the mixture for creating a dense smoke. These two chambers are provided with covers to prevent any escape of the odors and smoke except through the pipes C and D.

In the chamber A the composition used to create an offensive odor consisting of unslaked lime, carbonate of ammonia, corrosive sublimate and ammonia water is placed mixed in about the following proportions: unslaked lime, two ounces; carbonate of ammonia, one ounce; corrosive sublimate, one-eighth ounce, and a sufficient quantity of ammonia water; and in the chamber B the mixture intended to create a smoke consisting of quassia wood, tobacco, resin and sulphur, is placed in about the proportions of four to three to two to one. Rising from the top of each of these chambers or reservoirs are two pipes C D of unequal size, and which connect at their upper end with the spherical chamber F, which is provided with suitable means of attachment G, for suspending it from or fastening it to the tree. Extending from the top of this spherical chamber at any desired angle are a number of perforated pipes I, which may be of any suitable length and diameter, and over which the sleeves, collars or covers may be passed. Through the perforations in the tops of these pipes the mingled smoke and odors escape when the collars or covers are removed from over the openings, and these mingled odors and smoke, escaping into the trees, drive away and destroy the insects. If it is desired to have only a small portion of the odors and smoke escape, the collars may be adjusted so as to close nearly all of the openings and leave only those which are near the inner ends of the pipes uncovered. By this means any of the odors or smoke is prevented from escaping outside of the blossoms and being wasted. In the pipe which leads from the small chamber or reservoir, and in which the material is placed for producing an offensive odor, a valve is placed for the purpose of regulating the amount of odor which shall be mingled with the smoke.

To further assist in destroying and driving away insects, I may employ a belt or hoop which is adapted to be placed around the trunk of the tree at or near the ground, the said hoop being larger in circumference than the tree trunk itself. In the space left between the trunk and the hoop I place a mixture composed of the green parts, finely cut, of cedar wood and tobacco, wormwood, wild garlic, paris green and crude petroleum preferably in the following proportions: cedar branches, one pound; tobacco, one ounce; wormwood, one ounce; wild garlic, two ounces; paris green, one-fourth ounce, and as much crude petroleum as these ingredients will absorb or suck-up. The smoke generated from this mixture is more especially adapted for destroying and driving away insects upon the lower part of the tree, though it may be used in connection with the other mixtures.

It will be understood that the proportions of the ingredients of the several compositions or mixtures may be varied, to a certain extent, without affecting the general results.

What I claim as my invention is—

The method of destroying or driving away insects on or about trees consisting in mixing unslaked lime, carbonate of ammonia and corrosive sublimate in proper proportions in a suitable receptacle and vaporizing the same to produce an offensive odor by adding ammonia water; burning a suitable quantity of quassia wood, tobacco, resin and sulphur to produce a dense smoke; passing the gases or vapors from the two gases into a receptacle and commingling the same and passing the thus mixed gases into the atmosphere at points adjacent to the insects to be destroyed or driven away, substantially as described.

In testimony whereof I affix my signature in presence of two witnesses.

WILLIAM $\overset{\text{his}}{\times}$ T. YANDOW.
mark

Witnesses:
JOHN E. LAVELL,
RUFUS E. BROWN.